US012133519B2

(12) United States Patent
Crowle

(10) Patent No.: US 12,133,519 B2
(45) Date of Patent: Nov. 5, 2024

(54) ANTI-VERMIN APPARATUS FOR PROTECTING SUSPENDED LINES

(71) Applicant: William E. Crowle, Hudson (CA)

(72) Inventor: William E. Crowle, Hudson (CA)

( * ) Notice: Subject to any disclaimer, the term of this patent is extended or adjusted under 35 U.S.C. 154(b) by 241 days.

(21) Appl. No.: 17/741,636

(22) Filed: May 11, 2022

(65) Prior Publication Data

US 2023/0011600 A1    Jan. 12, 2023

Related U.S. Application Data

(60) Provisional application No. 63/220,701, filed on Jul. 12, 2021.

(51) Int. Cl.
*A01M 29/30*    (2011.01)
(52) U.S. Cl.
CPC .................................. *A01M 29/30* (2013.01)
(58) Field of Classification Search
CPC .............................. A01M 29/30; E04D 13/004
USPC .......................................................... 52/101
See application file for complete search history.

(56) References Cited

U.S. PATENT DOCUMENTS

| 5,570,652 A | * | 11/1996 | Ferland | B63B 21/12 |
| | | | | 114/221 R |
| 9,706,767 B2 | * | 7/2017 | Spencer | A01M 29/32 |
| 2002/0073633 A1 | * | 6/2002 | Schlichting | A01M 29/32 |
| | | | | 256/11 |

* cited by examiner

*Primary Examiner* — Patrick J Maestri
(74) *Attorney, Agent, or Firm* — Philip A. Swain; Equinox IP Inc.

(57) ABSTRACT

An anti-vermin apparatus for protecting suspended, overhead lines. The apparatus includes a line cover with an elongate junction. Two panels are connected to the junction and depending downwards from it. The panels are angled away from each other. The junction has a line mounting wall disposed towards a line. The wall is in moveable contact with the line and permits side-to-side rocking of the line cover. A ridge is connected to the junction and extends along its length. The ridge is located on the opposite side of the line mounting wall. The panels and the ridge are sized and shaped to balance the line cover on the line so that if a vermin applies force to one or both of the panels, it causes rotation of the line cover on the line a sufficient amount so that the vermin falls.

14 Claims, 7 Drawing Sheets

US 12,133,519 B2

ANTI-VERMIN APPARATUS FOR PROTECTING SUSPENDED LINES

CROSS-REFERENCE TO PREVIOUSLY FILED APPLICATION

Priority to previously filed United States provisional patent application Ser. No. 63/220,701, filed on Jul. 12, 2021 is hereby claimed, the entire contents of which are hereby incorporated by reference.

TECHNICAL FIELD

The present generally concerns controlling vermin, and more particularly to an apparatus to prevent vermin from traversing and/or damaging lines.

BACKGROUND

Vermin such as mice, rats, squirrels and the like are known to crawl along suspended wires such as telephone wires, power lines, and the like to gain access to areas where they are not wanted. If left unimpeded, the vermin can cause costly damage to the lines themselves or to structures that the lines are connected to. In some cases, the vermin can damage the cables with their claws and they often chew through the cable or the insulation.

Simple barriers located around the lines can initially form a barrier to unwanted vermin movement, but after a time, the vermin learn how to navigate over the barriers.

Thus, there is a clear need for an inexpensive, easy to install anti-vermin apparatus that prevents vermin from damaging lines and attendant structures.

BRIEF SUMMARY

I have significantly reduced, or essentially eliminated, the problems associated with the vermin described above by designing an apparatus that essentially bars any unwanted vermin such as rodents or animals, from moving along suspended wires or cables. The apparatus is mounted on a line in a balanced manner such that when a vermin attempts to cross the line, the apparatus rotates due to unbalancing thereby causing the vermin to fall off. The apparatus can be installed on existing wires or cables without the need for the wire to be loosen or removed. Areas of use can be, but not limited to, any and all suspended wire or cable, telephone wires and other communication wire, electrical supply wires, support or guy wires, ships and boat mooring lines, ropes or hawsers.

Accordingly, in one embodiment there is provided an anti-vermin apparatus for protecting overhead lines, the apparatus comprising:
a line covering member having an elongate junction with first and second panels being connected thereto and depending therefrom, the first and second panels being angled away from each other, the elongate junction having a line mounting wall disposed towards a line and in moveable contact therewith to permit lateral rocking of the line covering member thereabouts; and
an elongate ridge connected to and extending substantially along the entire length of the elongate junction, the elongate ridge being located on the opposite side of the line mounting wall;
the first and second panels and the elongate ridge being sized and shaped to balance the line covering member on the line such that a vermin applying force to one or both of the first and second panels causes rotation of the line covering member on the line a sufficient amount such that the vermin falls off the first or second panel.

In one example, the first and second panels include first and second spaced apart end edges; and first and second lower edges.

In another example, first and second stabilizer rods are connected between the respective first and second panels, the stabilizer rods are located near the elongate junction.

In another example, the first and second lower edges of the first and second panels each include first and second balancing weights, the balancing weights being located substantially halfway between the first and second spaced apart end edges.

In yet another example, the first and second panels are generally rectangle shaped.

In one example, the elongate ridge is an upstanding elongate wall extending along substantially the entire length of the elongate junction.

In another example, the elongate ridge member is a curved upstanding wall. The elongate ridge member is a zig-zag shaped upstanding wall.

In one example, the apparatus, is generally A shaped when viewed in cross section.

In another example, the line mounting wall is angled such that it is coaxial with the line axis.

In one example, the lines are overhead lines, The overhead lines are power lines, cables, insulated cables, ropes, hawsers. The overhead lines are suspended.

Accordingly, in another embodiment there is provided an anti-vermin apparatus for protecting overhead lines, the apparatus comprising:
a balanced line covering member having an elongate junction with first and second panels being connected thereto and depending therefrom, the first and second panels being angled away from each other; the elongate junction having a line mounting wall disposed towards a line and in moveable contact therewith to permit lateral rocking of the balanced line covering member thereabouts;
the first and second panels being sized and shaped to balance the line covering member on the line such that a vermin applying force to one or both of the first and second panels causes rotation of the line covering member on the line a sufficient amount such that the vermin falls off the first or second panel.

In one example, the apparatus further includes an elongate ridge connected to and extending substantially along the entire length of the elongate junction, the elongate ridge being located on the opposite side of the line mounting wall. The first and second panels and the elongate ridge being sized and shaped to balance the line covering member on the line such that the vermin applying force to one or both of the first and second panels causes rotation of the line covering member on the line a sufficient amount such that the vermin falls off the first or second panel.

In one example, the first and second panels include first and second spaced apart end edges; and first and second lower edges.

In another example, first and second stabilizer rods are connected between the respective first and second panels, the stabilizer rods are located near the elongate junction.

In one example, the first and second lower edges of the first and second panels each include first and second balancing weights, the balancing weights being located substantially halfway between the first and second spaced apart end edges.

In one example, the first and second panels are generally rectangle shaped.

In yet another example, the elongate ridge is an upstanding elongate wall extending along substantially the entire length of the elongate junction.

In still another example, the elongate ridge is a curved upstanding wall. The curved upstanding wall is wave-like.

In one example, the elongate ridge member is a zig-zag shaped upstanding wall.

In another example, the apparatus is generally A shaped when viewed in cross section.

In one example, the line mounting wall is angled such that it is coaxial with the line axis.

In one example, the lines are overhead lines, The overhead lines are power lines, cables, insulated cables, ropes, hawsers. The overhead lines are suspended.

In one example, the apparatus, as described above, in which a stop is connected to the line, the line being angled relative to the ground.

BRIEF DESCRIPTION OF THE DRAWINGS

These and other features of that described herein will become more apparent from the following description in which reference is made to the appended drawings wherein.

DETAILED DESCRIPTION

Definitions

Unless otherwise specified, the following definitions apply:

The singular forms "a", "an" and "the" include corresponding plural references unless the context clearly dictates otherwise.

As used herein, the term "comprising" is intended to mean that the list of elements following the word "comprising" are required or mandatory but that other elements are optional and may or may not be present.

As used herein, the term "consisting of" is intended to mean including and limited to whatever follows the phrase "consisting of". Thus, the phrase "consisting of" indicates that the listed elements are required or mandatory and that no other elements may be present.

As used herein, the term "line(s)" is intended to mean any cable, wire, rope, hawser and the like that is typically suspended above the ground. In the examples shown, the line may be covered with insulating material or it may be naked.

As used herein, the term "vermin" is intended to mean any small animal capable of damaging the line either by chewing or use of claws, or both, or using the line as an access pathway. Such animals include, but not limited to, mice, rats, squirrels, beaver, birds, and raccoons.

Figure 1:
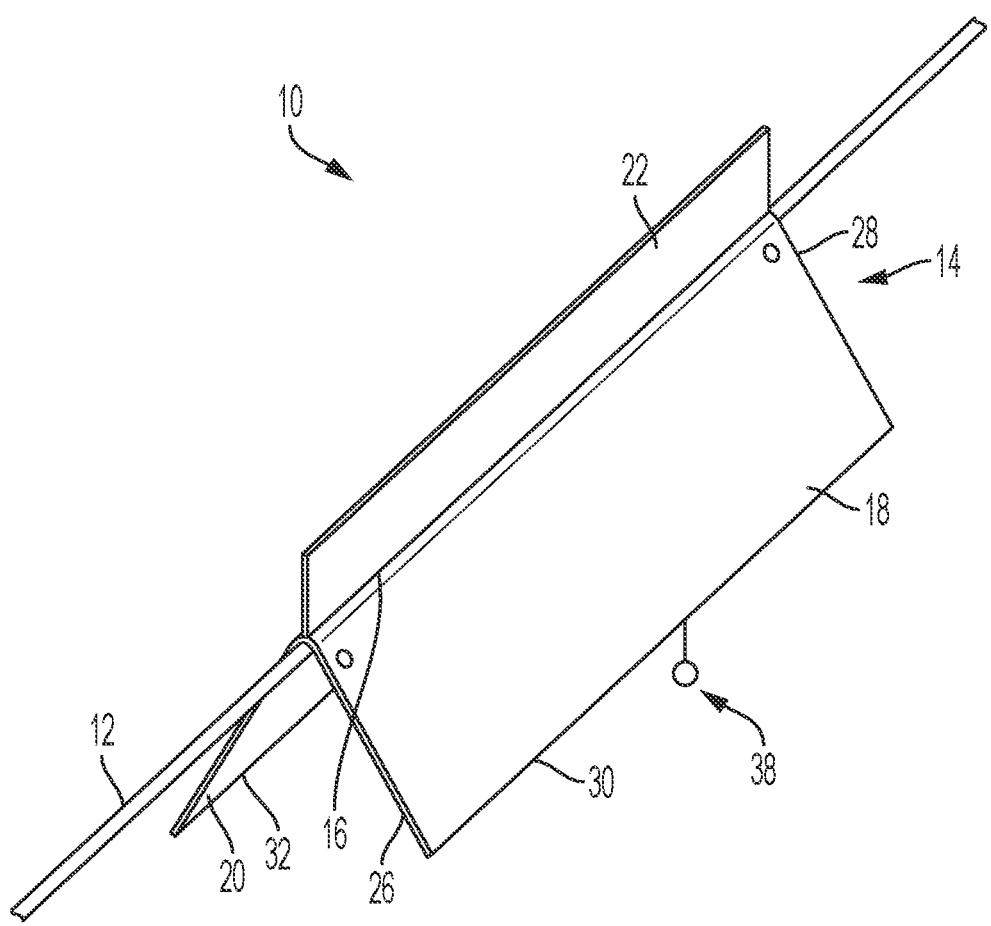
FIG. 1 is a perspective view of an embodiment of an anti-vermin apparatus for protecting overhead line.

Referring to FIG. 1, there is shown generally at 10 an apparatus for barring the movement of vermin (also known as an "anti-vermin" apparatus) along a line 12. Since the apparatus 10 will be located outside or at least will be exposed to the weather, the materials used in constructing the apparatus 10 and its constitutive components are constructed from weatherproof material. The weatherproof material prevents degradation by oxidation or rust caused by rain and melting snow/ice. Also, the apparatus 10 is for use with lines that are suspended above the ground, although this should not be seen as a limitation because the apparatus 10 can also be used for protecting lines that are located along the sides of building, telegraph poles, vehicles, and the like. The material used to construct the apparatus 10 generally has smooth, non-gripping surfaces. Also, the material used is sufficiently hard so that the claws of the vermin cannot grip the apparatus 10. Such material includes, but is not limited to, very hard plastic or other manmade material, such as fiberglass, plastic, galvanized steel, stainless steel, aluminum or the equivalent. The apparatus 10 is used to protect lines 12 that are typically overhead or otherwise suspended. The apparatus 10 is balanced when mounted on the line 12. Generally speaking, the apparatus 10 is threaded onto the line 12 or located on top and secured as will be described below.

Figure 2:
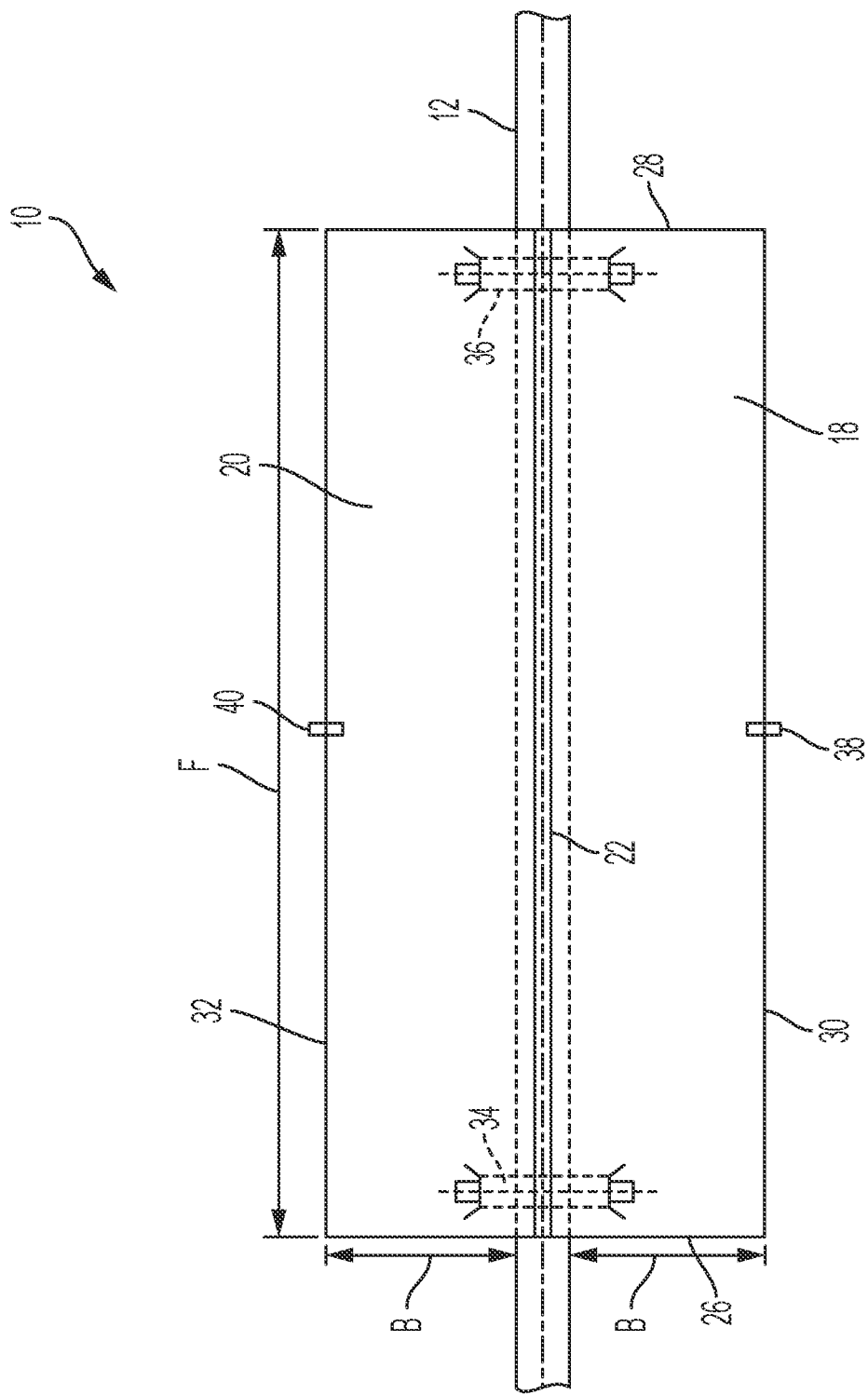
FIG. 2 is a plan view of the apparatus of FIG. 1 showing an elongate straight ridge member and two securing bolts.
Figure 3:
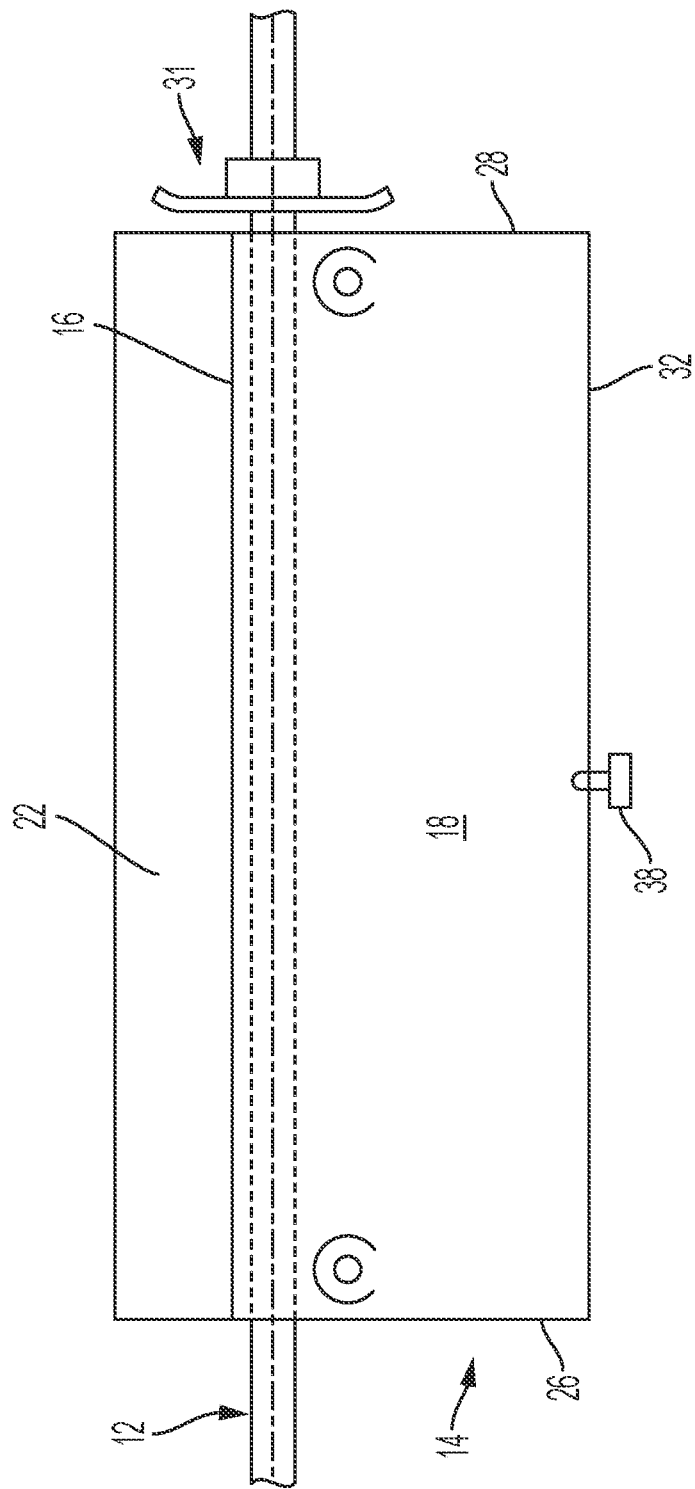
FIG. 3 is a longitudinal side view of the apparatus of FIG. 1.
Figure 4:
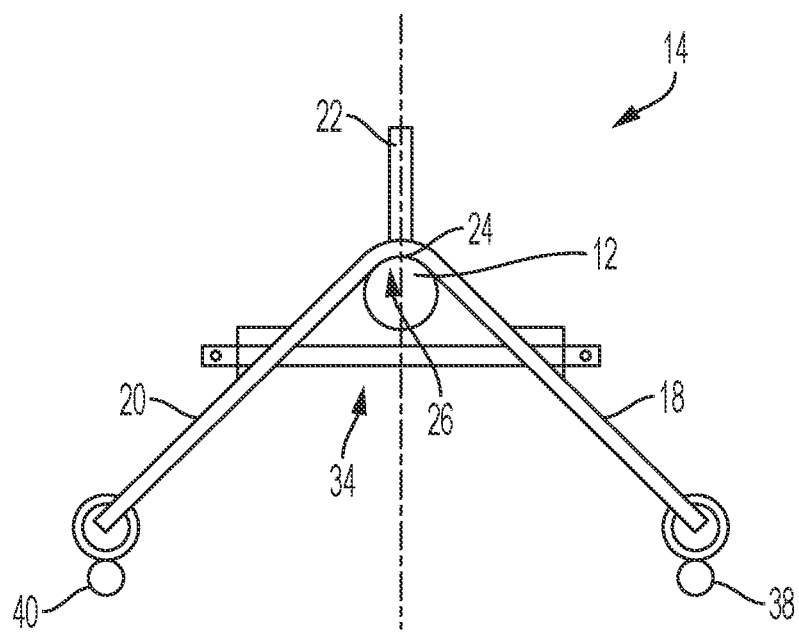
FIG. 4 is an end view of the apparatus of FIG. 1 showing two weighted side panels.

Referring to FIG. 1 and now to FIGS. 2, 3, and 4, broadly speaking, the apparatus 10 includes a line covering member 14, a, elongate junction, 16, first and second panels 18, 20, and an elongate ridge 22. The first and second panels 18, 20 are connected to the elongate junction 16 and are contiguous with the junction 16. In constructing the line covering member 14, a single piece of square or rectangular material is deformed by bending the material over to form, in essence an A-shaped line covering member 14 when viewed from either end. The first and second panels 18, 20 depend from the elongate junction 16 and are deformed in such a manner that they are angled away from each other. Because the line covering member 14 is made from a single sheet of material, when folded over to create the first and second panels 18, 20, generally speaking they are rectangle shaped. It should be noted that a person of ordinary skill in the art will readily recognize that the first and second panels 18, 20 can be any shaped depending on the initial shape of the un-folded sheet As best seen in FIGS. 1 and 3, the elongate ridge 22 is connected to the junction 16 and extends substantially along the entire length of the elongate junction 16. The elongate junction 16 has a line mounting wall 24 disposed towards the line 12. The elongate ridge 22 is an upstanding elongate wall 25 that extends along substantially the entire length of the elongate junction 16.

As best seen in FIG. 4, the line 12 has a radius 26 and an outer line surface 28. The line mounting wall 24 is curved so that it registers with the curvature of the line 12 and is in moveable contact with it. The line mounting wall is angled such that it is coaxial with the line axis. This movement permits lateral rocking of the line covering member 14 on top of and about the line 12. The material from which the line covering member 14 is made is sufficiently smooth so that there is little or no resistance between the line 12 and the line mounting wall 24. The elongate ridge 22 is located on the opposite side of the line mounting wall 24. The first and second panels 18, 20 and the elongate ridge 22 are sized and shaped to balance the line covering member 24 on the line 12. Any vermin that attempts to move along the line will come into contact with the line covering member 14. If the vermin attempts to climb onto the line covering member, any of its weight that it applies to one or either of the panels 18, 20 will cause rotation of the line covering member 14 on the line 12 by an amount that is sufficient amount so that the vermin will slide and fall off the first or second pane 18, 20. Furthermore, if the vermin attempts to climb onto the elongate ridge 22, that too will cause rotation of the line covering member 14 and cause the vermin to fall off.

Referring back to FIGS. 1, 2 and 3, the first and second panels 18, 20 include first and second spaced apart end edges 26, 28. Also, the first and second panels 18, 20 include first and second lower edges 30, 32.

Referring now to FIGS. 2 and 4, the line covering member 14 is stabilized using first and second stabilizer rods 34, 36 that are connected the respective first and second panels 18, 20. The stabilizer rods 34, 36 are located near the elongate junction 16. The first and second lower edges 30, 32 of the first and second panels each include first and second balancing weights 38, 40, which are located substantially halfway between the first and second spaced apart end edges 26, 28.

Figure 5:
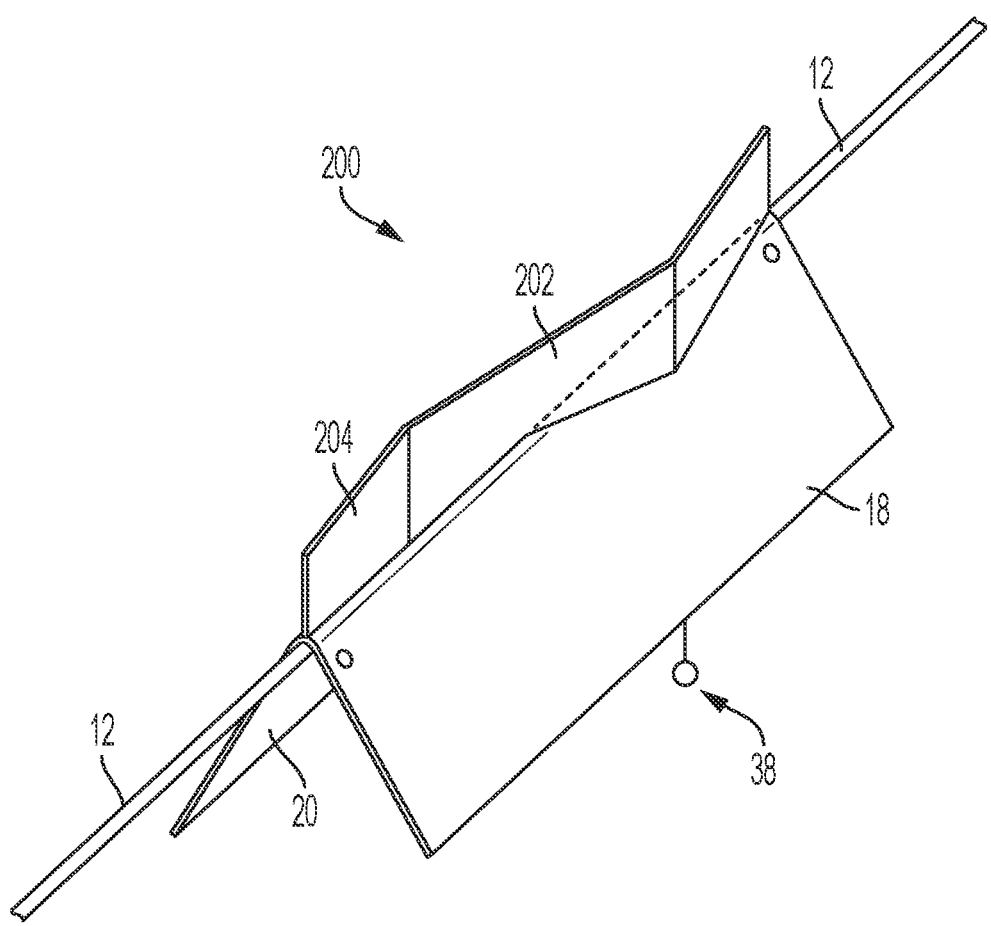
FIG. 5 is a perspective view of an alternative embodiment of an anti-vermin apparatus for protecting overhead line.
Figure 6:
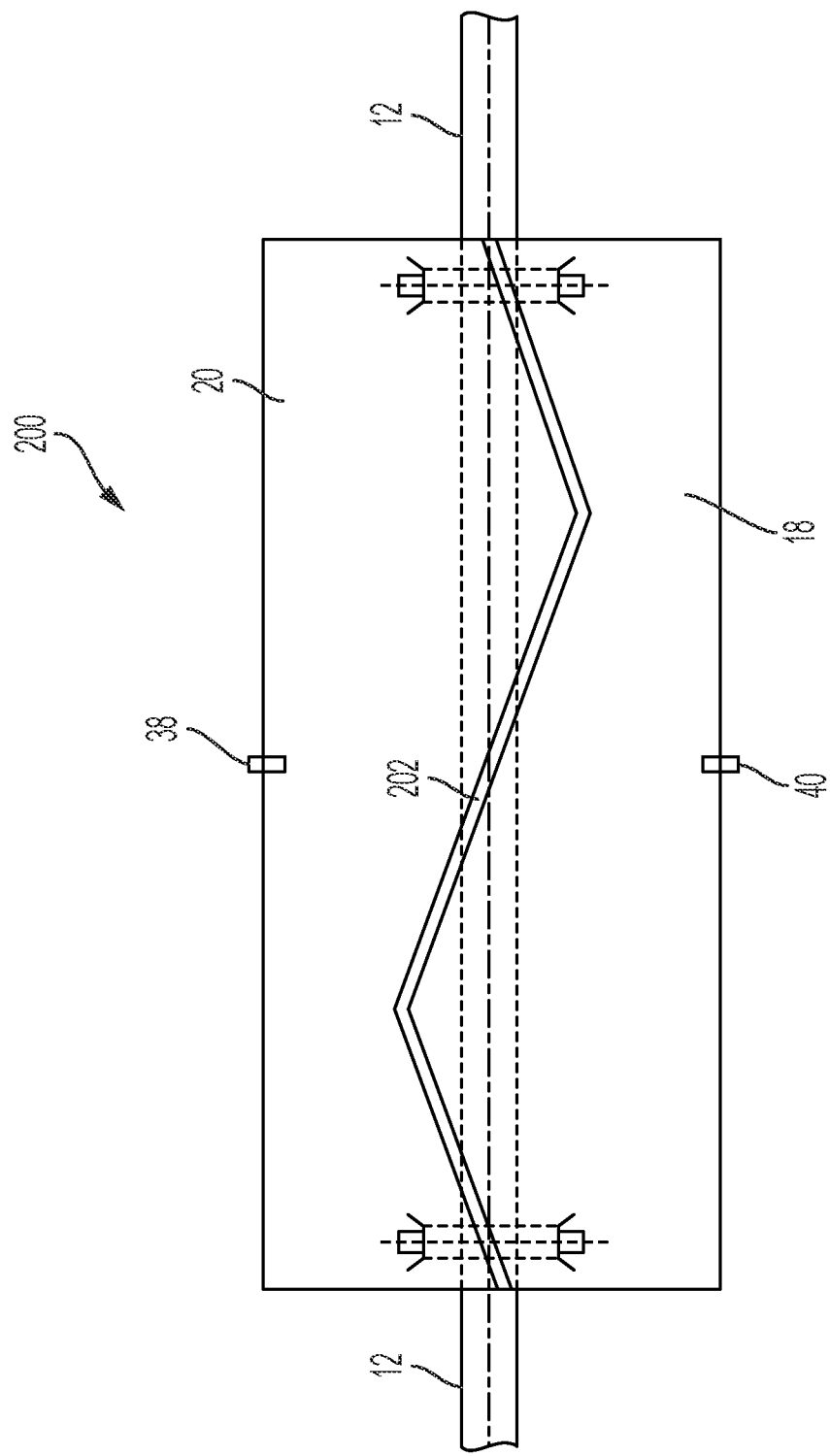
FIG. 6 is a plan view of the apparatus of FIG. 5 showing a zig-zag shaped ridge member.

Referring now to FIGS. 5 and 6, there is shown generally at 200, an alternative embodiment of an anti-vermin apparatus. The apparatus 200 includes an elongate zig-zag ridge 202 which extends away from the junction, In this embodiment, the elongate zig-zag ridge is a zig-zag shaped upstanding wall 204 that advantageously bars any vermin from attempting to cross over the line covering member by grasping the ridge. The angled parts of the zig-zag wall make it extremely difficult for the vermin to grasp and eventually it will cause unbalancing for the apparatus and ultimately falling off.

Figure 7:
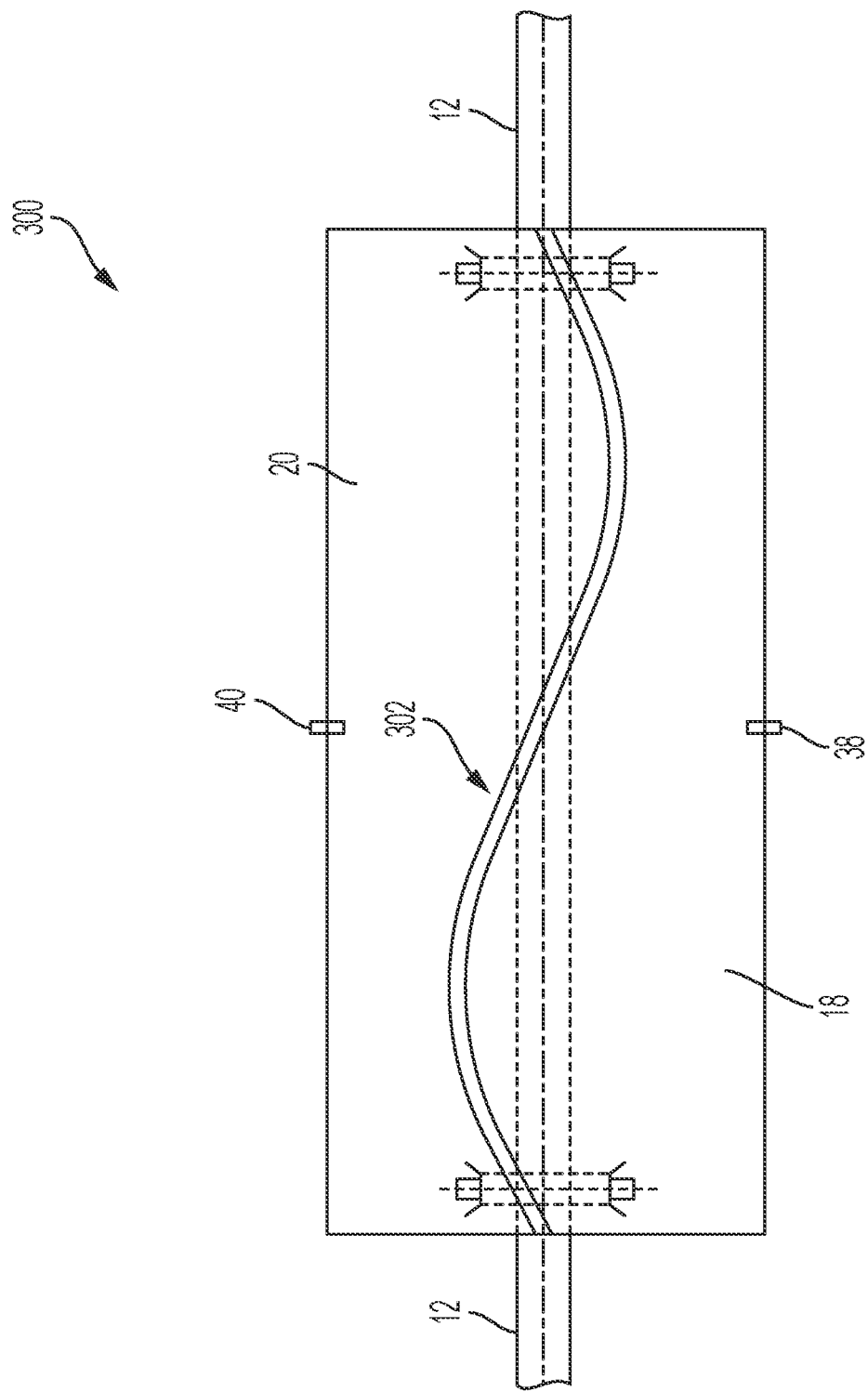
FIG. 7 is a plan view an alternative embodiment of an anti-vermin apparatus showing a waved ridge member.

Referring now to FIG. 7, another alternative embodiment is shown generally at 300. In this apparatus 300, the ridge is a curved ridge 302, and more specifically a waved ridge. Like the zig-zag, the curved ridge provides little or no surface for the vermin to grabs onto and thus eventually causing unbalancing and falling to the ground.

Generally speaking, as best seen in FIGS. 2 and 3, the single sheet of material when bent over provides two rectangles of width "B" and length "F", which are bent in the middle, cast or welded, down the full length at the radius 26 to form an inverted V. The ridge 22 is either contiguous with the folded over sheet or it is connected to the top of the inverted V. Alternatively, as shown in FIGS. 5 and 7, the ridge can be bent to form a zig-zag or curved. Of course, the person skilled in the art will recognize that the length of the ridge would have to be longer in the case of the zig-zag ridge or the curved ridge when compared to the straight ridge of FIG. 1 Advantageously, should the vermin loose its balance, the immediate reaction is to put a foot on one of the panels. This causes rotation of the apparatus about the line about the cable. For desirable balance, both the panels 18, 20 have to be of equal length, thickness and weight so as to keep the apparatus 10 balanced centrally on the line 12. Where the panels 18, 20 meet above the line 12, the junction 16 (the joint) must be smooth and have a large enough inside radius 26 so as to freely rotate about the line 12. The apparatus 100 length F must be such that the vermin cannot jump over it. At the extremity of the panels 10, 20 the optional weights 38, 40 can either be built into the panels or suspended from the panels at the center point. The weights permit the apparatus 10 to rotate back to the default resting position after the apparatus has been rotated so as to be ready for the next potential vermin.

As seen in FIG. 3, located at either end of the apparatus 10, below the diameter of the line 12, is located the weather proof securing bolt or pin 34. The bolt or pin 34 is easily installed or removed, and yet is sufficiently secure so that it does not fall out if the apparatus 10 is rotated. The purpose of the securing bolt or pin 34 is to stop the apparatus 10 from falling off the line 12 if it is rotated. The ridge 22 is designed to extend vertically. This is where the vermin will have to walk or crawl to move across the apparatus 10. The higher the ridge 22 the more likely the vermin will lose its balance and cause the apparatus 10 to rotate Finally, as best seen in FIG. 4, is the apparatus 10 is installed on a cable that has a slope or catenary in it, there is a stop 31 is installed at the downhill side of the apparatus 10. The stop 31 can be fitted onto a line (cable) that has fixed ends i.e. an existing line. The stop 31 must clamp firmly to the cable so as not to move. The side of the stop 31 that is disposed towards the apparatus 10 must be smooth, even and orthogonal (perpendicular) to the line, so as not to inhibit the apparatus 10 from rotating

OTHER EMBODIMENTS

From the foregoing description, it will be apparent to one of ordinary skill in the art that variations and modifications may be made to the embodiments described herein to adapt it to various usages and conditions.

What is claimed is:

1. An anti-vermin apparatus for protecting overhead lines, the apparatus comprising:
    a line covering member having an elongate junction with first and second panels being connected thereto and depending therefrom, the first and second panels being angled away from each other; the elongate junction having a line mounting wall disposed towards a line and in moveable contact therewith to permit lateral rocking of the line covering member thereabouts;
    an elongate ridge connected to and extending substantially along the entire length of the elongate junction, the elongate ridge being located on the opposite side of the line mounting wall; and
    first and second stabilizer rods are connected between the respective first and second panels, the stabilizer rods are located near the elongate junction;
    the first and second panels and the elongate ridge being sized and shaped to balance the line covering member on the line such that a vermin applying force to one or both of the first and second panels causes rotation of the line covering member on the line a sufficient amount such that the vermin falls off the first or second panel.

2. The apparatus, according to claim 1, in which the first and second panels include first and second spaced apart end edges; and the first panel includes a first lower edge and the second panel includes a second lower edge.

3. The apparatus, according to claim 2, in which the first lower edge of the first panel and the second lower edge of the second panel each include first and second balancing weights, the balancing weights being located substantially halfway between the first and second spaced apart end edges.

4. The apparatus, according to claim 1, in which the first and second panels are generally rectangle shaped.

5. The apparatus, according to claim 1, in which the elongate ridge is an upstanding elongate wall extending along substantially the entire length of the elongate junction.

6. The apparatus, according to claim 1, in which the elongate ridge is a curved upstanding wall.

7. The apparatus, according to claim 1, in which the elongate ridge is a zig-zag shaped upstanding wall.

8. The apparatus, according to claim 1, is generally A shaped when viewed in cross section.

9. The apparatus, according to claim 1, in which the line mounting wall is angled such that it is coaxial with the line axis.

10. The apparatus, according to claim 1, in which the lines are overhead lines.

11. The apparatus, according to claim 10, in which the overhead lines are power lines, cables, insulated cables, ropes, hawsers.

12. The apparatus, according to claim 1, in which the overhead lines are suspended.

13. The apparatus, according to claim 6, in which the curved upstanding wall has a waved shape.

14. The apparatus, according to claim 1, further including a stop configured to be located on a downhill side thereof when the line is sloped, wherein the stop is configured to be fitted on the line.

\* \* \* \* \*